US008576684B2

United States Patent
Kim et al.

(10) Patent No.: US 8,576,684 B2
(45) Date of Patent: Nov. 5, 2013

(54) COMPATIBLE OPTICAL PICKUP AND OPTICAL INFORMATION STORAGE MEDIUM APPARATUS USING THE SAME

(75) Inventors: Ui-yol Kim, Suwon-si (KR); Yong-jae Lee, Suwon-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 13/282,635

(22) Filed: Oct. 27, 2011

(65) Prior Publication Data

US 2012/0106311 A1    May 3, 2012

(30) Foreign Application Priority Data

Oct. 28, 2010    (KR) .......................... 10-2010-0106033

(51) Int. Cl.
G11B 7/00 (2006.01)
G11B 7/135 (2012.01)
G11B 5/58 (2006.01)
G11B 5/55 (2006.01)

(52) U.S. Cl.
USPC ............ 369/112.05; 369/109.01; 369/110.03; 369/112.03; 369/112.07; 369/112.12; 369/124.12; 369/44.41; 369/53.22; 369/53.27; 369/53.35

(58) Field of Classification Search
USPC ............ 369/109.01, 109.02, 110.03, 112.03, 369/112.04, 112.07, 112.12, 124.12, 44.41, 369/53.22, 53.27, 53.35, 44.37, 112.05
See application file for complete search history.

(56) References Cited

U.S. PATENT DOCUMENTS

| | | | |
|---|---|---|---|
| 2003/0179680 A1* | 9/2003 | Park et al. ................. | 369/112.04 |
| 2008/0049566 A1* | 2/2008 | Hamaguchi et al. ........ | 369/44.23 |
| 2008/0056103 A1* | 3/2008 | Kawasaki et al. ............. | 369/116 |
| 2009/0086611 A1* | 4/2009 | Isshiki et al. ............. | 369/112.24 |
| 2009/0196146 A1 | 8/2009 | Hotta et al. | |
| 2010/0014410 A1* | 1/2010 | Nakao et al. .................. | 369/103 |

FOREIGN PATENT DOCUMENTS

| | | |
|---|---|---|
| JP | 2007-164962 | 6/2007 |
| JP | 10-2008-0005465 | 1/2008 |
| JP | 2009-140529 A | 6/2009 |
| JP | 4592528 | 9/2010 |
| KR | 10-2010-0041699 | 4/2010 |
| WO | WO 2006/004081 A1 | 1/2006 |

OTHER PUBLICATIONS

Korean Office Action issued Feb. 27, 2013 in counterpart Korean Patent Application No. KR 10-2010-0106033 (4 pages, in Korean).

* cited by examiner

*Primary Examiner* — Aneeta Yodichkas
(74) *Attorney, Agent, or Firm* — NSIP Law

(57) ABSTRACT

An optical pickup and an information storage medium system using the same. The optical pickup includes a light source that emits light having a plurality of different wavelengths. The optical pickup includes a diffraction device having a plurality of diffraction patterns corresponding to the plurality of different wavelengths to divide the light incident from the light source unit into main light and sub light. The optical pickup further includes a photo-detector having a first main light reception unit that receives the main light and a first sub light reception unit that receives the sub light so as to detect an information signal and/or an error signal by receiving reflected light. The first sub light reception unit of the photo-detector is shaped so as to reduce reception of noise sub light due to diffraction based on an undesired diffraction pattern of sub light generated the diffraction device.

21 Claims, 11 Drawing Sheets

COMPATIBLE OPTICAL PICKUP AND OPTICAL INFORMATION STORAGE MEDIUM APPARATUS USING THE SAME

CROSS-REFERENCE TO RELATED PATENT APPLICATION

This application claims the benefit of Korean Patent Application No. 10-2010-0106033, filed on Oct. 28, 2010, in the Korean Intellectual Property Office, the entire disclosure of which is incorporated herein in by reference for all purposes.

BACKGROUND

1. Field

The following description relates to a compatible optical pickup and an optical information storage medium system using the same, and additionally, to a compatible optical pickup in which a single diffraction device is shared and used to divide light having a plurality of wavelengths and an optical information storage medium system using the same.

2. Description of the Related Art

In an optical pickup, a diffraction device for dividing light output from a light source into three beams is used to detect a tracking error signal by a three-beam method or a differential push-pull method. In a compatible optical pickup for compatibly operating a plurality of different kinds of optical information storage media, e.g., a Digital Versatile Disc (DVD) and a Compact Disc (CD), using different wavelengths by applying a 2-wavelength light source to the compatible optical pickup, if light output from the 2-wavelength light source is divided by a single shared diffraction device, the diffraction device may be formed in a structure in which a diffraction pattern for dividing light of a wavelength for a DVD is included in one side of the diffraction device and a diffraction pattern for dividing light of a wavelength for a CD is included in the other side thereof.

If light of, for example, the wavelength for a DVD is incident on the diffraction device, undesired noise light may be generated due to diffraction by the diffraction pattern for dividing light of the wavelength for a CD besides diffraction on the diffraction pattern for dividing light of the wavelength for a DVD and is incident to a light reception surface of a photo-detector for a DVD.

The noise light affects a detection signal of sub-light for a DVD, thereby affecting a tracking error signal.

SUMMARY

In one general aspect, there is provided an optical pickup. The optical pickup includes a light source unit that is configured to emit light having a plurality of different wavelengths which are suitable for at least one of recording and reproducing data to a plurality of information storage media, a diffraction device comprising a plurality of diffraction patterns corresponding to the plurality of different wavelengths, the diffraction device being configured to divide the light incident from the light source unit into main light and sub light, an objective lens that is configured to focus incident light so as to form an optical spot for at least one of recording and reproducing of an information storage medium, and a photo-detector comprising a first main light reception unit that is configured to receive the main light and a first sub light reception unit that is configured to receive the sub light to detect at least one of an information signal and an error signal, by receiving light reflected from the information storage medium. The first sub light reception unit of the photo-detector is formed in a pattern such that an area, on which noise sub light is incident, shaped so as to reduce reception of the noise sub light due to diffraction based on an undesired diffraction pattern of sub light being generated by the diffraction device.

The plurality of information storage media may include a Digital Versatile Disc (DVD) and a Compact Disc (CD). The light source unit may emit light of a first wavelength which is suitable for a DVD and light of a second wavelength which is suitable for a CD. The first sub light reception part of the photo-detector may reduce reception of noise sub light based on the light of the first wavelength.

The area of the first sub light reception unit, which is shaped so as to reduce reception of the noise sub light, may include a recessed area that is formed to have a radius of curvature larger than the noise sub light.

The first main light reception unit and the first sub light reception unit of the photo-detector may receive light of the first wavelength. The photo-detector may include a second main light reception unit and a second sub light reception unit that is configured to receive light of the second wavelength.

The plurality of diffraction patterns of the diffraction device may include a first diffraction pattern that is configured to divide the light of the first wavelength and to provide the divided light to the first main light reception unit and the first sub light reception unit, and a second diffraction pattern that is configured to divide the light of the second wavelength and to provide the divided light to the second main light reception unit and the second sub light reception unit.

The first main light reception unit and the first sub light reception unit of the photo-detector may receive light of the first wavelength. The photo-detector may include a second main light reception unit and a second sub light reception unit that is configured to receive light of the second wavelength.

The plurality of diffraction patterns of the diffraction device may include a first diffraction pattern that is configured to divide the light of the first wavelength and to provide the divided light to the first main light reception unit and the first sub light reception unit. The plurality of diffraction patterns of the diffraction device may also include a second diffraction pattern that is configured to divide the light of the second wavelength and to provide the divided light to the second main light reception unit and the second sub light reception unit.

The light source may emit a plurality of different wavelengths such that at least a subset of the plurality of different wavelengths is suitable for at least one of recording and reproducing data to the plurality of information storage media.

The optical pickup may be included in an electronic device. The electronic device may be one of a portable game console, a portable/personal multimedia player (PMP), a portable laptop PC, a desktop PC, a game console, a high definition television (HDTV), an optical disc player/recorder, and a set top box.

In another aspect, there is provided an optical pickup. The optical pickup includes a light source unit that includes a first light source that is configured to emit light of a first wavelength which is suitable for a DVD, and light of a second wavelength which is suitable for a CD, and a second light source which is suitable for a BD, a diffraction device comprising a plurality of diffraction patterns corresponding to the plurality of different wavelengths, the diffraction device being configured to divide light emitted by the light source unit into main light and sub light, an objective lens that is configured to focus incident light so as to form an optical spot for at least one of recording and reproducing of an information storage medium, and a photo-detector comprising a first main light reception unit that is configured to receive the main light and a first sub light reception part that is configured to receive the sub light so as to detect at least one of an information signal and an error signal by receiving light reflected from the optical information storage medium. The first sub light reception unit of the photo-detector is formed in a pattern such that an area, on which noise sub light is incident, is shaped so as to reduce reception of the noise sub light due to diffraction based on an undesired diffraction pattern of sub light with respect to the light of the first wavelength being generated by the diffraction device.

The objective lens may be used for a DVD and a CD. The optical pickup may further include a second objective lens for a BD.

The area of the sub light reception unit, which is shaped so as to reduce reception of sub light, may include a recessed area that is formed to have a radius of curvature larger than the noise sub light.

The optical pickup may be included in an electronic device. The electronic device may be one of a portable game console, a portable/personal multimedia player (PMP), a portable lap-top PC, a desktop PC, a game console, a high definition television (HDTV), an optical disc player/recorder, and a set top box.

In another aspect, there is provided an information storage medium apparatus. The information storage medium apparatus includes an optical pickup that is movably installed in a radius direction of an information storage medium so as to reproduce information recorded on the information storage medium or record information on the information storage medium, and a controller that is configured to control the optical pickup. The optical pickup includes a light source unit that is configured to emit light having a plurality of different wavelengths, at least a subset of the plurality of different wavelengths being suitable for at least one of recording and reproducing data to a plurality of information storage media, a diffraction device comprising a plurality of diffraction patterns corresponding to the plurality of different wavelengths, the diffraction device being configured to divide the light incident from the light source unit into main light and sub light, an objective lens that is configured to focus incident light so as to form an optical spot for at least one of recording and reproducing of an information storage medium, and a photo-detector comprising a first main light unit that is configured to receive the main light and a first sub light reception unit that is configured to receive the sub light to detect at least one of an information signal and an error signal, by receiving light reflected from the information storage medium. The first sub light reception unit of the photo-detector is formed in a pattern such that an area on which noise sub light is incident is shaped so as to reduce reception of the noise due to diffraction based on an undesired diffraction pattern of sub light being generated by the diffraction device.

The plurality of information storage media may include a Digital Versatile Disc (DVD) and a Compact Disc (CD). The light source unit may emit light of a first wavelength which is suitable for a DVD and light of a second wavelength which is suitable for a CD. The first sub light reception unit of the photo-detector reduces reception of noise sub light based on the light of the first wavelength.

The area of the first sub light reception unit, which is shaped so as to reduce reception of the noise sub light, may include a recessed area that is formed to have a radius of curvature larger than the noise sub light.

The first main light reception unit and the first sub light reception unit of the photo-detector may receive light of the first wavelength. The photo-detector may also include a second main light reception unit and a second sub light reception that are configured to receive light of the second wavelength suitable for a CD.

The plurality of diffraction patterns of the diffraction device may include a first diffraction pattern that is configured to divide the light of the first wavelength and to provide the divided light to the first main light reception unit and the first sub light reception unit; and a second diffraction pattern that is configured to divide the light of the second wavelength and to provide the divided light to the second main light reception unit and the second sub light reception unit.

The first main light reception unit and the first sub light reception unit of the photo-detector may receive light of the first wavelength. The photo-detector may include a second main light reception unit and a second sub light reception unit that are configured to receive light of the second wavelength.

The plurality of diffraction patterns of the diffraction device may include a first diffraction pattern that is configured to divide the light of the first wavelength and to provide the divided light to the first main light reception part and the first sub light reception unit, and a second diffraction pattern that is configured to divide the light of the second wavelength and to provide the divided light to the second main light reception unit and the second sub light reception unit.

The area of the sub light reception unit, which is shaped so as to reduce reception of noise sub light, may include a recessed area that is formed to have a radius of curvature larger than the noise sub light.

The optical pickup of the information storage medium apparatus may include a second light source which is suitable for a Blu-ray disc (BD).

The objective lens of the optical pickup may be used for a DVD and a CD. The optical pickup may also include a second objective lens for a BD.

The information storage medium apparatus may be included in an electronic device. The electronic device may be one of a portable game console, a portable/personal multimedia player (PMP), a portable lap-top PC, a desktop PC, a game console, a high definition television (HDTV), an optical disc player/recorder, and a set top box.

Other features and aspects may be apparent from the following detailed description, the drawings, and the claims.

Figure 1:
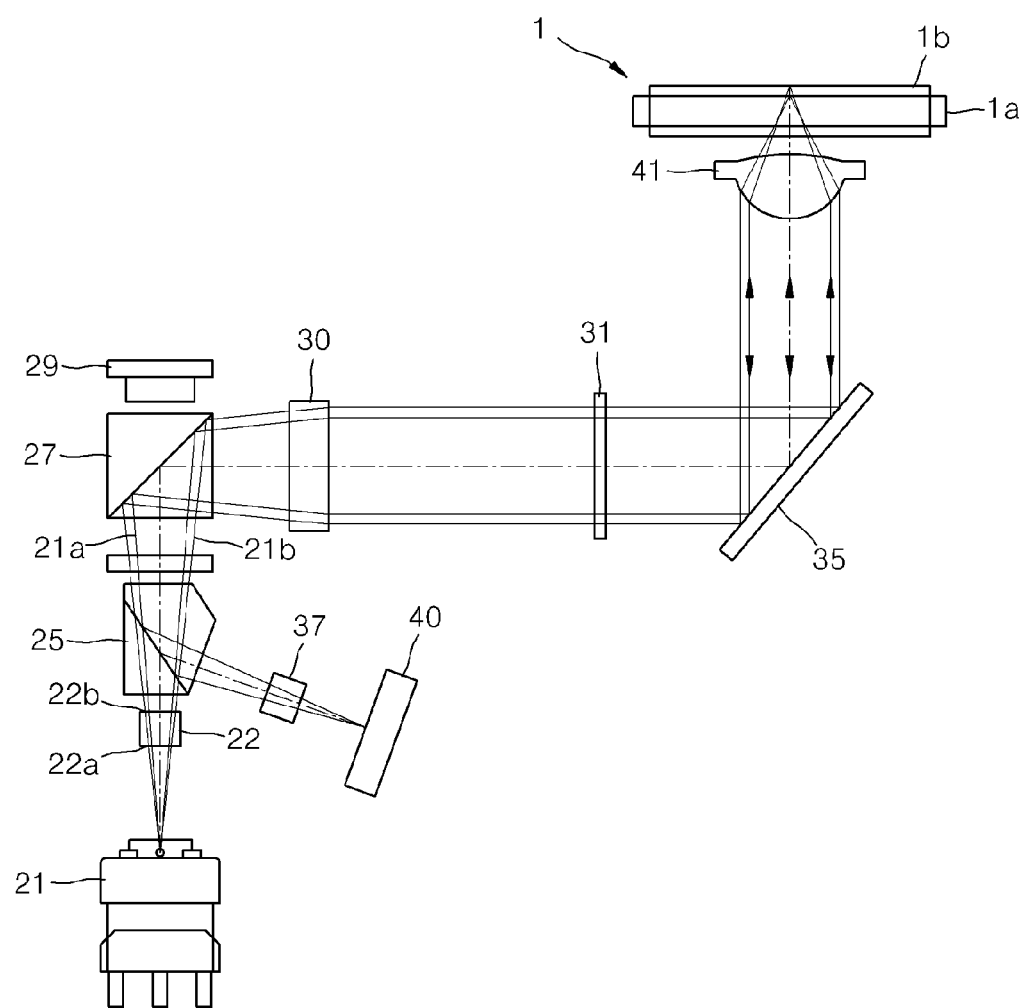
FIG. 1 is a diagram illustrating an example of an optical configuration of a compatible optical pickup.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
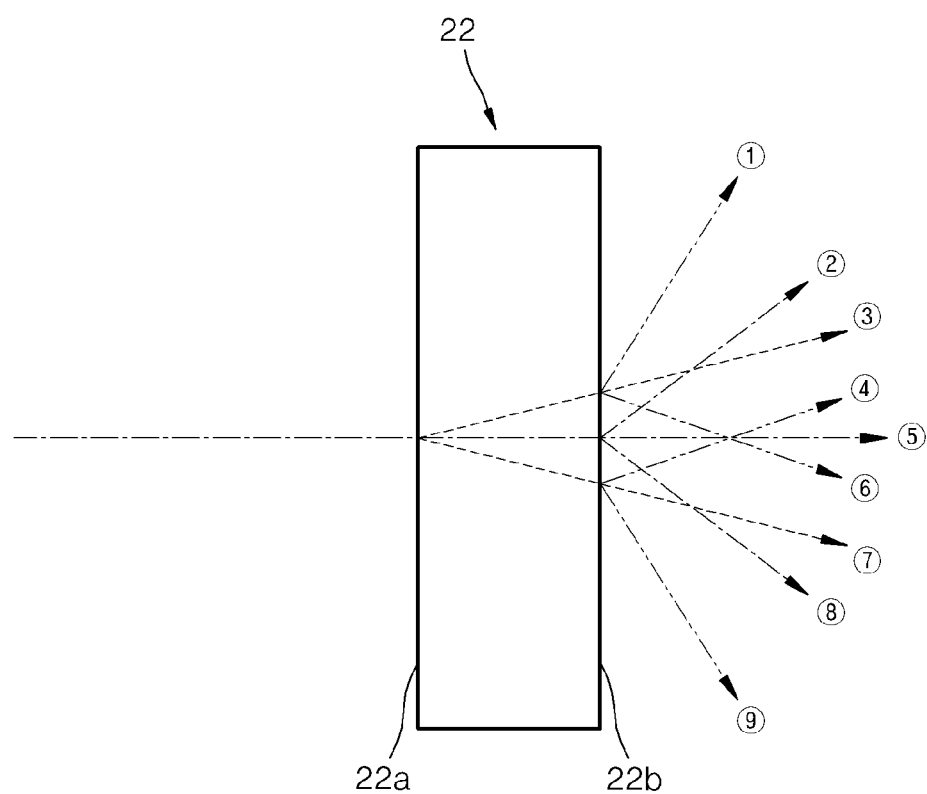
FIG. 2 is a diagram illustrating an example of paths of light divided when first light is incident to a diffraction device such as, for example, the diffraction device illustrated in FIG. 1.
Figure 3:
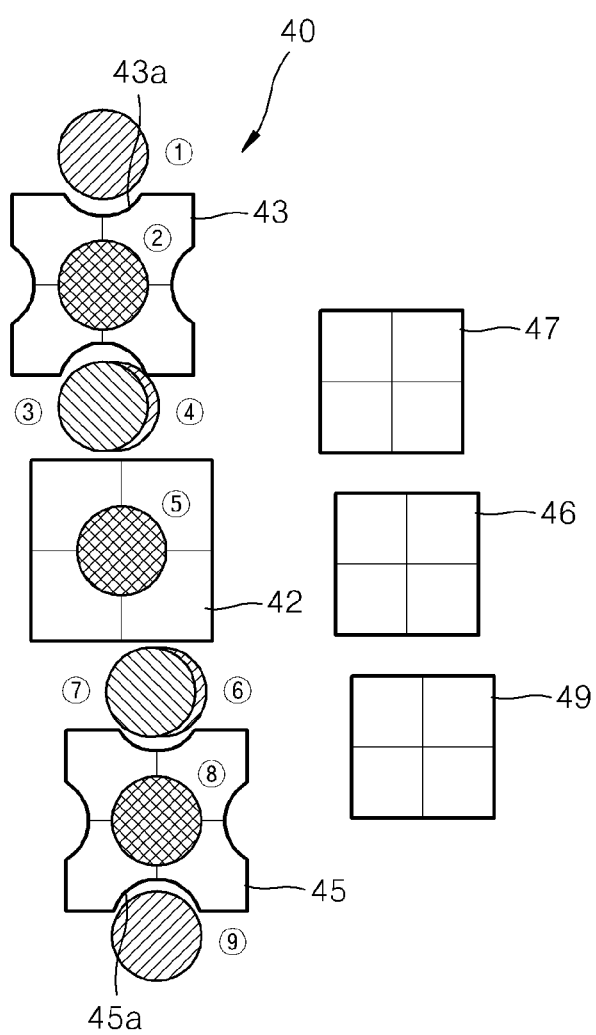
FIG. 3 is a diagram illustrating an example of positions on a photo-detector at which light, which is divided by a diffraction device such as, for example, the diffraction device illustrated in FIG. 2, is directed.

FIG. 1 is a drawing illustrating an example of a configuration of a compatible optical pickup. FIG. 2 illustrates an example of paths of light divided when first light is incident to a diffraction device 22 such as, for example the diffraction device 22 illustrated in FIG. 1. FIG. 3 illustrates an example of directions of light in a photo-detector 40, if light is divided by a diffraction device such as, for example, the diffraction device 22 illustrated in FIG. 2. As an example, the compatible optical pickup of FIG. 1 may compatibly use at least two kinds of optical information storage media having different recording densities and formats (e.g., an optical disc of a Digital Versatile Disc (DVD) series and an optical disc of a Compact Disc (CD) series, or a DVD and an optical disc of a Blu-ray Disc (BD) series). Hereinafter, an example of compatibly using a DVD and a CD is described for simplicity.

Referring to FIG. 1, the compatible optical pickup includes a light source unit 21 that is configured to emit light having a plurality of different wavelengths. The plurality of different wavelengths of light are suitable for use in writing data to or reading data from a plurality of optical information storage media 1 having different recording densities and different thicknesses. The compatible optical pickup also includes a diffraction device 22 that is configured to divide light incident from the light source unit 21 into main light and sub light. The compatible optical pickup includes an objective lens 41 that is configured to form an optical spot for recording and/or reproducing of the optical information storage media 1. The objective lens 41 records and/or reproduces optical information from the storage media 1 by focusing the incident light. The compatible optical pickup includes a photo-detector 40 that is configured to receive reflected light (e.g., light reflected by the storage media 1) and to detect an information signal and/or an error signal. As an example, the compatible optical pickup may further include an optical path changer 25. For example, the optical path changer may be a polarization beam splitter. The optical path changer may refract an optical path so as to guide the light reflected from the optical information storage media 1 to the photo-detector 40. The optical path changer 25 may be provided on an optical path between the light source unit 21 and the objective lens 41. The compatible optical pickup may further include a collimating lens 30 that is configured to collimate the incident light and a polarization converter (e.g., a ¼-wave plate) 31, that changes polarization of the incident light. The collimating lens 30 and/or the polarization converter 31 may be provided on the optical path between the light source unit 21 and the objective lens 41. The compatible optical pickup may further include a monitoring photo-detector 29 that is configured to detect and monitor the light output intensity of the light source unit 21. The compatible optical pickup may further include an astigmatic lens 37 such as, for example, a cylindrical lens. The astigmatic lens 37 may be configured to detect a focus error signal by an astigmatic method. As an example, the astigmatic lens 37 may be provided on an optical path between the optical path changer 25 and the photo-detector 40. Although a beam splitter 27 is further included between the optical path changer 25 and the monitoring photo-detector 29 in FIG. 1, the optical system of FIG. 1 may have a configuration without the beam splitter 27. In addition, although the example illustrated in FIG. 1 includes a mirror member 35 that is configured to reflect the light incident from the light source unit 21 to the objective lens 41, the optical system of FIG. 1 may have a configuration without the mirror member 35.

The light source unit 21 may emit light having a plurality of different wavelengths so as to be compatible with a plurality of optical information storage media 1 (e.g., a DVD 1a and a CD 1b), having different recording densities and different thicknesses. For example, the light source unit 21 may emit first light having a wavelength of about 650 nm suitable for a DVD 1a and second light having a wavelength of about 780 nm suitable for a CD 1b. The light source unit 21 may include a twin light source containing two semiconductor lasers. As another example, the light source unit 21 may include a combination of a first light source for emitting the first light, a second light source for emitting the second light, and an optical path coupler, such as a beam splitter, which is configured to couple optical paths of the first light and the second light emitted from the first and second light sources.

The objective lens 41 forms an optical spot of a desired size at a desired focusing position on the plurality of optical information storage media 1. For example, if the compatible optical pickup is configured to use the DVD 1a and the CD 1b, the objective lens 41 may form optical spots suitable for the DVD 1a and the CD 1b. In other words, the objective lens 41 forms an optical spot of a desired size at a desired position associated with writing data to or reading data from at least one of the plurality of optical information storage media 1.

Referring to FIGS. 2 and 3, the diffraction device 22 has a plurality of diffraction patterns corresponding to a plurality of light beams to divide the light incident from the light source unit 21 into the main light and the sub light, and the photo-detector 40 includes a first main light reception part 42 for receiving the main light and first sub light reception parts 43 and 45 for receiving the sub light. The first sub light reception parts 43 and 45 of the photo-detector 40 may be formed in a pattern where areas 43a and 45a on which noise sub light is incident are recessed in order to reduce reception of the noise sub light generated due to diffraction according to an undesired diffraction pattern of the diffraction device 22. As an example, the recessed areas 43a and 45a of the first sub light reception parts 43 and 45 may be formed to have a radius of curvature larger than the noise sub light.

If the light source unit 21 emits the first light having a first wavelength which is suitable for writing data to or reading data from a DVD 1a and the second light having a second wavelength which is suitable for writing data to or reading data from a CD 1b, the first main light reception part 42 and the first sub light reception parts 43 and 45 of the photo-detector 40 may receive the first light of the first wavelength suitable for the DVD 1a, and the first sub light reception parts 43 and 45 may reduce reception of noise sub light according to the first light of the first wavelength. In addition, the photo-detector 40 may further include a second main light reception part 46 and second sub light reception parts 47 and 49 for receiving the second light of a second wavelength suitable for the CD1b. The first sub light reception parts 43 and 45 and the second sub light reception parts 47 and 49 may be configured to detect a push pull signal. For example, in order to detect a push-pull signal, the first sub light reception parts 43 and 45 and the second sub light reception parts 47 and 49 may have a 4-division structure as shown in FIG. 3. As another example, in order to detect a push-pull signal, the first sub light reception parts 43 and 45 and the second sub light reception parts 47 and 49 may have a 2-division structure. The photo detector 40 may be configured to detect a focus error signal. Additionally, the photo detector 40 may be configured to detect a focus error signal by the astigmatic method. For example, in order to detect a focus error signal using the astigmatic method, the first main light reception part 42 and the second main light reception part 46 may also have a 4-division structure.

The diffraction device 22 has the diffraction patterns corresponding to a plurality of light beams so as to divide the light incident from the light source unit 21 into the main light and the sub light. For example, if the light source unit 21 emits the first light of the first wavelength suitable for the DVD 1a and the second light of the second wavelength suitable for the CD 1b, as described above, the diffraction device 22 may include a first diffraction pattern surface 22b as one surface of the diffraction device 22, and a second diffraction pattern surface 22a as the other surface of the diffraction device 22a. The first diffraction pattern surface 22b may be configured to divide the first light having the first wavelength to be received by the first main light reception part 42 and the first sub light reception parts 43 and 45. The second diffraction pattern surface 22a may be configured to divide the second light to be received by the second main light reception part 46 and the second sub light reception parts 47 and 49.

For purposes of describing the various aspects, it is assumed that a diffraction pattern surface in a direction of light incident from the light source unit 21 is the second diffraction pattern surface 22a and a diffraction pattern surface in the opposite direction is the first diffraction pattern surface 22b. In other words, the second diffraction pattern surface 22a is the surface of the diffraction device 22 on which incident light emitted from the light source 21 interacts with first on the optical path from the light source unit 21 to the optical information storage media 1. The light emitted from the light source 21 interacts with the first diffraction pattern 22b subsequent to the interaction between the incident light and the second diffraction pattern surface 22a. The first diffraction pattern 22b appears subsequent to the second diffraction pattern 22a in the optical path from the light source 21 to the optical information storage media 1. It is further assumed that the first light of the first wavelength is diffracted by the first diffraction pattern surface 22b and directed to the first main light reception part 42 and the first sub light reception parts 43 and 45. Because the first light of the first wavelength is not only diffracted by the first diffraction pattern surface 22b but also substantially diffracted by the second diffraction pattern surface 22a. For example, the first light incident to the diffraction device 22 may be first divided into 3 light beams by the second diffraction pattern surface 22a, and each of the 3 divided light beams may be once more divided into 3 light beams by the first diffraction pattern surface 22b. As an example, in recording/reproducing of the DVD 1a, the first light to be used for signal detection is a main light beam (5) and sub light beams (2) and (8) which corresponds to light that passes through the second diffraction pattern surface 22a straightly (e.g., so as not to be deflected by the diffraction pattern surface 22a) and thereafter divided by the first diffraction pattern surface 22b. For example, as illustrated in FIG. 3, the main light beam (5) and sub light beams (2) and (8) are respectively received by the first main light reception part 42 and the first sub light reception parts 43 and 45 of the photo-detector 40. Accordingly, the main light reception part 42 and the first sub light reception parts 43 and 45 perform signal detection of the main light beam (5) and sub light beams (2) and (8) for the DVD1a.

As shown in FIG. 2, the first light divided into a + or − first-order diffracted light beam by the second diffraction pattern surface 22a is further divided into zero-order, + first-order, and − first-order diffracted light beams by the first diffraction pattern surface 22b, thereby generating six noise sub light beams (1), (3), (4), (6), (7), and (9).

In other words, the first diffraction pattern surface 22b once more divides the + or − first-order diffracted light beam which was diffracted by the second diffraction pattern surface 22a. The six noise sub light beams (1), (3), (4), (6), (7), and (9) may thus be directed to form optical spots on the light reception surface of the photo-detector 40, as shown in FIG. 3. As an example, Table 1 shows diffraction efficiencies of the main light beam (5), the sub light beams (2) and (8), and the six noise sub light beams (1), (3), (4), (6), (7), and (9). Although the diffraction efficiency values may vary during various experiments or measurements, the relative ratio of diffraction efficiencies among the diffracted light beams is fairly representative of the diffraction pattern. For example, although a diffraction efficiency value can vary based on a diffraction pattern design, a deviation of a relative ratio does not vary largely.

TABLE 1

| Diffracted light beam | Diffraction efficiency |
| --- | --- |
| (1) | 0.26 |
| (2) | 6.13 |
| (3) | 3.10 |
| (4) | 0.26 |
| (5) | 73.47 |
| (6) | 0.26 |
| (7) | 3.10 |
| (8) | 6.13 |
| (9) | 0.26 |

As shown in Table 1 and as illustrated in FIG. 3, the intensity of the noise sub light beams (3) and (7) may affect a detection signal of the sub light beams (2) and (8) which are received by the first sub light reception parts 43 and 45 respectively.

A Tracking Error Signal (TES), such as, for example, a DPP signal, in a differential push-pull method is defined by a sum of a main push-pull signal MPP and a sub push-pull signal SPP. For example, the main push-pull signal MPP is a push-pull signal of a detection signal of the main light beam ⑤ that is detected by the first main light reception part 42. The sub push-pull signal SPP is a sum of a push-pull signal of a detection signal of the sub light beam ② that is detected by the first sub light reception part 43, and a push-pull signal of a detection signal of the sub light beam ⑧ that is detected by the first sub light reception part 45.

Because the intensity of the noise sub light beams ③ and ⑦ can affect a detection signal of the sub light beams ② and ⑧ received by the first sub light reception parts 43 and 45, the noise sub light beams ③ and ⑦ largely affect the sub push-pull signal SPP.

The photo-detector 40 may include the first sub light reception parts 43 and 45 formed in a pattern such that the areas 43a and 45a on which the noise sub light beams ③ and ⑦ are incident are recessed as shown in FIG. 3. For example, the areas 43a and 45a are configured so as to reduce the effect of the noise sub light beams ③ and ⑦. As an example, the recessed areas 43a and 45a of the first sub light reception parts 43 and 45 may be formed to have a radius of curvature larger than the noise sub light beams ③ and ⑦. Such a configuration provides for excellent signal characteristics.

If the first sub light reception parts 43 and 45 are formed in a pattern such that the areas 43a and 45a, on which the noise sub light beams ③ and ⑦ are incident, are recessed, the detected sub push-pull signal SPP is rarely affected by the noise sub light beams ③ and ⑦, thereby showing excellent signal characteristics.

Figure 4A:
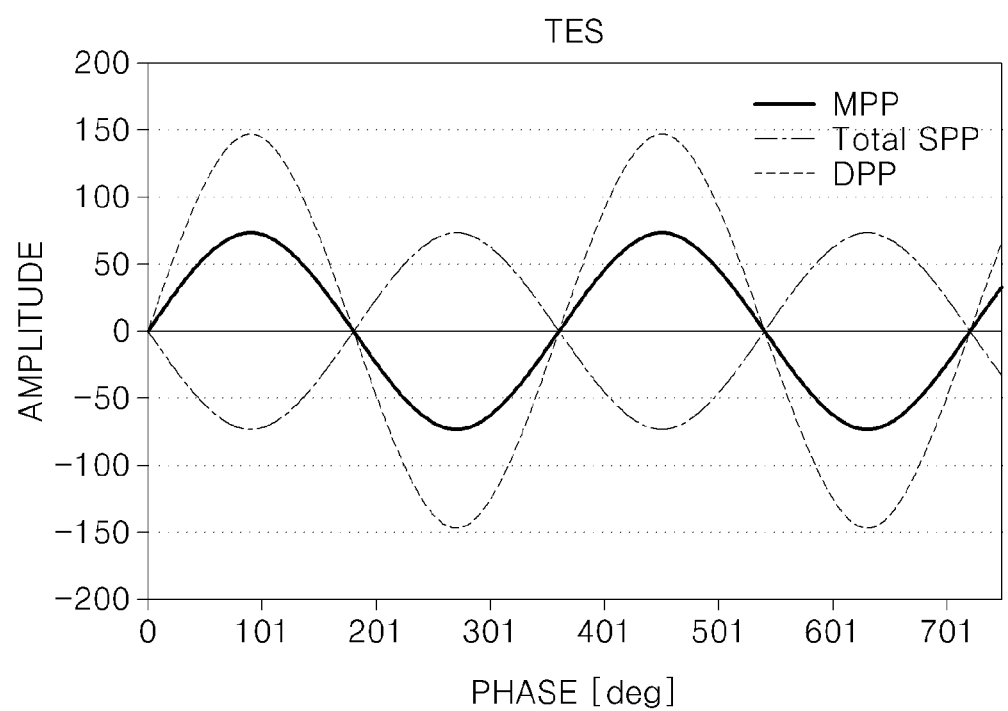
FIG. 4A is a diagram illustrating an example of a main push-pull signal MPP, a total sub push-pull signal Total SPP, and a differential push-pull signal DPP when a photo-detector, in which a first sub light reception part is formed in a pattern where an area on which noise sub light is incident is recessed such as, for example, that illustrated in FIG. 3, is used.
Figure 4B:
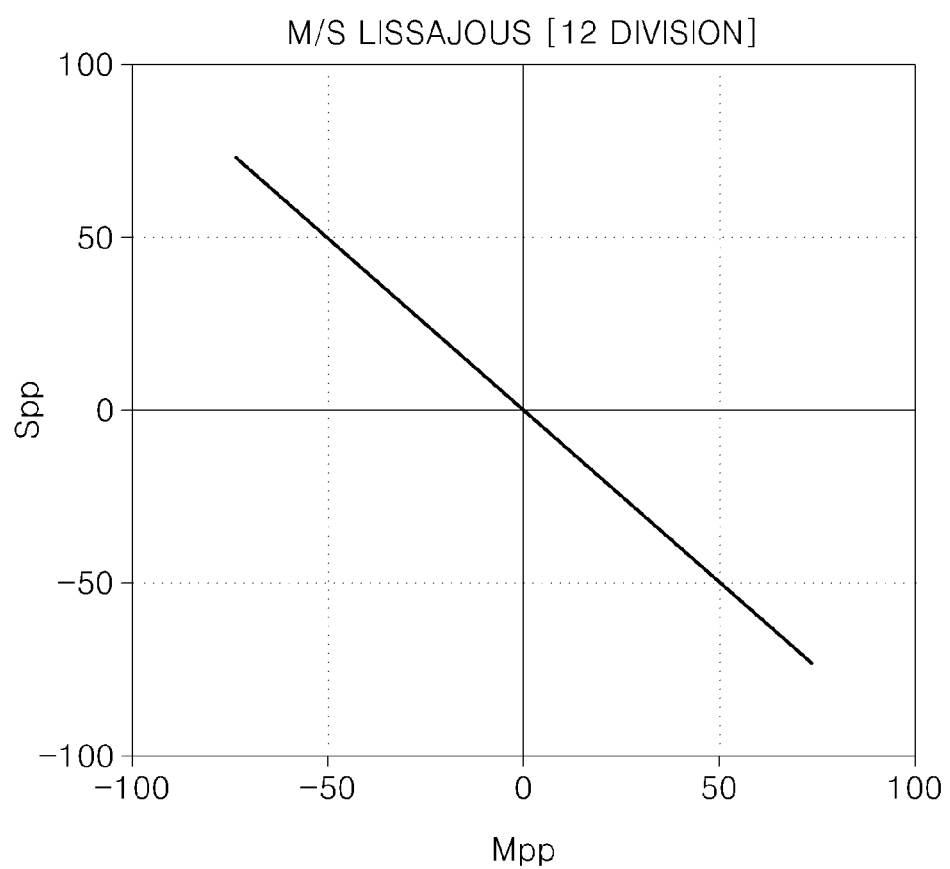
FIG. 4B is a diagram illustrating an example of a Lissajous pattern of a ratio of a main push-pull signal MPP to a sub push-pull signal SPP.

FIG. 4A is a graph illustrating the main push-pull signal (MPP), a total sub push-pull signal (Total SPP), and the differential push-pull signal (DPP) corresponding to the signals detected using a photo-detector 40, in which the first sub light reception parts 43 and 45 are formed in a pattern such that the areas 43a and 45a, on which the noise sub light beams ③ and ⑦ are incident, are recessed such as, for example, the photo-detector 40 illustrated in FIG. 3. FIG. 4B is a graph schematically illustrating a Lissajous pattern of a ratio of the main push-pull signal (MPP) to the sub push-pull signal (SPP). The total sub push-pull signal (Total SPP) indicates a sum of sub push-pull signals of the first sub light reception parts 43 and 45, and the differential push-pull signal (DPP) is a TES and indicates a sum of the main push-pull signal (MPP) and the total sub push-pull signal (Total SPP).

As shown in FIGS. 4A and 4B, if the photo-detector 40 is formed to be rarely affected by the noise sub light beams ③ and ⑦, a TES having excellent characteristics can be detected.

Figure 5:
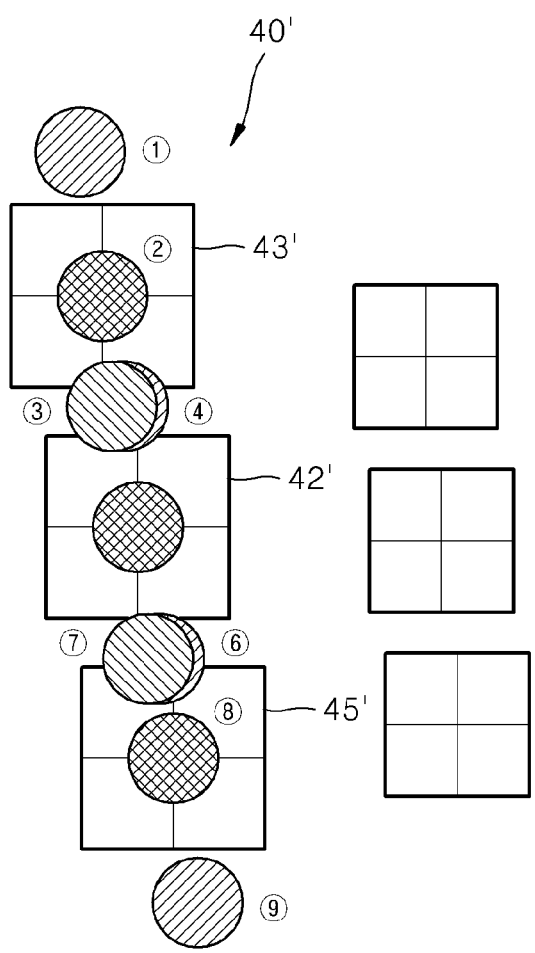
FIG. 5 is a drawing illustrating an example of a configuration of a general photo-detector.
Figure 6A:
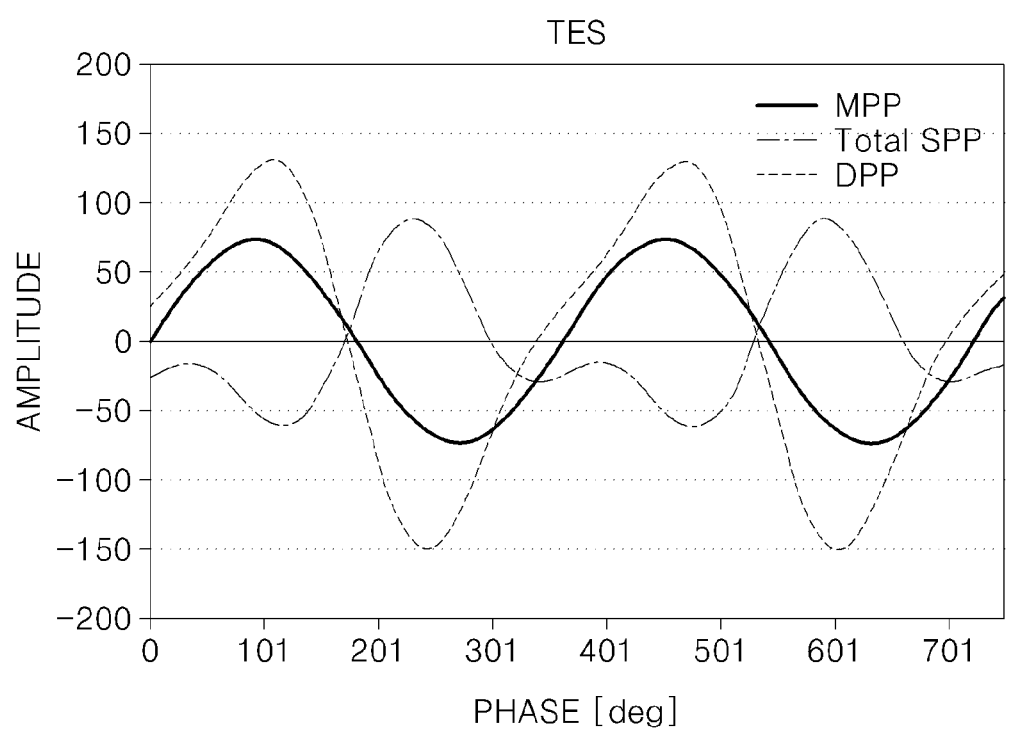
FIG. 6A is a diagram illustrating an example of a main push-pull signal MPP, a total sub push-pull signal Total SPP, and a differential push-pull signal DPP when a photo-detector structure such as, for example, that illustrated in FIG. 5 is used.

As a comparison example, as shown in FIG. 5, when a photo-detector 40' has a structure without the pattern where the areas 43a and 45a on which the noise sub light beams ③ and ⑦ are incident are recessed, a detection signal of the sub light beams ② and ⑧ is largely affected by the noise sub light beams ③ and ⑦. Accordingly, the main push-pull signal (MPP), the total sub push-pull signal (Total SPP), and the differential push-pull signal (DPP) show bad characteristics as shown in FIG. 6A. A Lissajous pattern of a ratio of the main push-pull signal (MPP) to the sub push-pull signal (SPP) shows bad characteristics as shown in FIG. 6B.

Figure 6B:
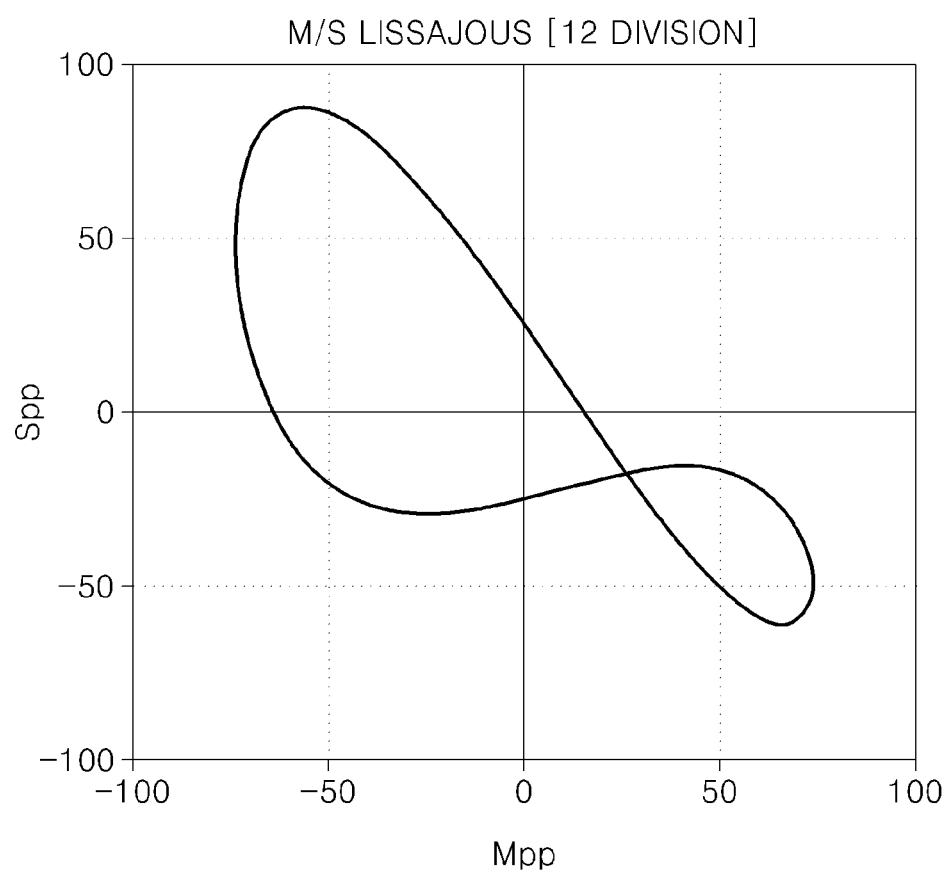
FIG. 6B is a diagram illustrating an example of a Lissajous pattern of a ratio of a main push-pull signal MPP to a sub push-pull signal SPP when a photo-detector structure such as, for example, that illustrated in FIG. 5 is used.

As shown in FIGS. 6A and 6B, when a detection signal of the sub light beams ② and ⑧ is largely affected by the noise sub light beams ③ and ⑦, characteristics of the TES is significantly deteriorated.

Figure 7:
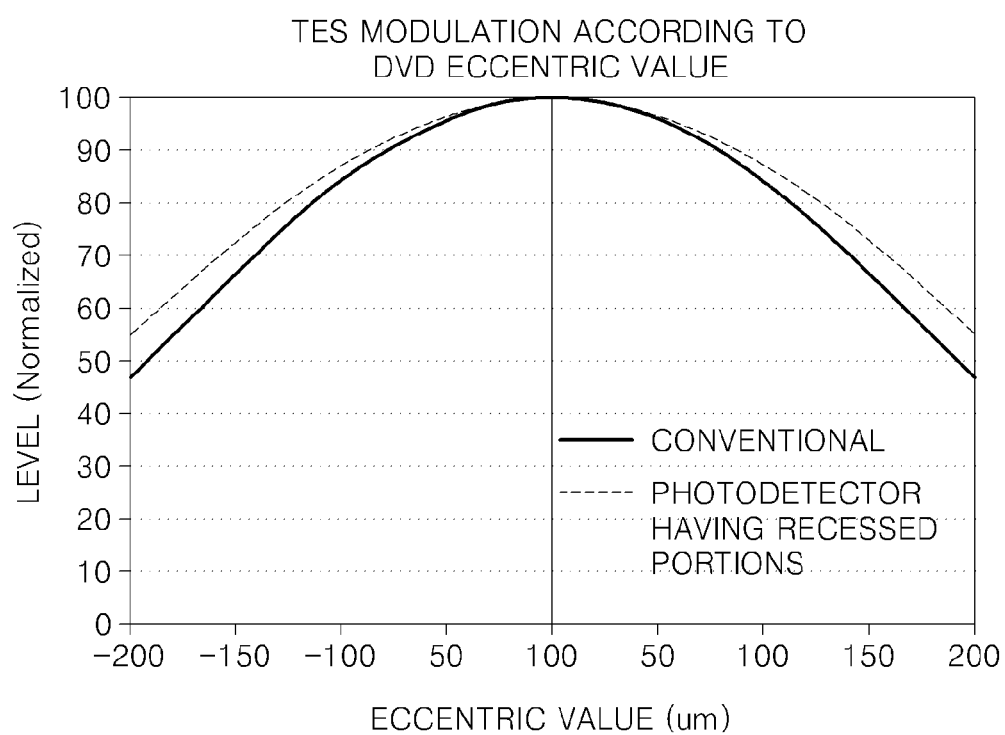
FIG. 7 is a diagram illustrating an example of a comparison of Tracking Error Signal (TES) modulation according to an eccentric value of an optical information storage medium when a photo-detector provided by one aspectis used and when a conventional photo-detector is used.

FIG. 7 is a graph showing a comparison of TES modulation according to an eccentric value of the optical information storage media 1 (the DVD 1a) when the photo-detector 40 is configured to have areas 43a and 45a which are recessed is used and when a general photo-detector 40' is used.

As illustrated in FIG. 5, if a general photo-detector 40' is used, a distance between reception parts must be increased in order to reduce the noise caused by sub light beams. For example, a first main light reception part 42' and first sub light reception parts 43' and 45' needs to be positioned far from one another in order for a detection signal of the sub light beams ② and ⑧ to be less affected by the noise sub light beams ③ and ⑦. In other words, if the reception parts of the photo-detector 40' illustrated in FIG. 5 are positioned at a similar distance to the reception parts of photo-detector 40 illustrated in FIG. 3, then the photo-detector 40' then detection of sub-light beams ② and ⑧ would be relatively affected by the noise sub light beams ③ and ⑦ than that of photo-detector 40. Because a distance between the main light and the sub light incident onto the optical information storage media 1 must be farther than, for example, the distance required by an optical device using a photo-detector such as photo-detector 40 illustrated in FIG. 3, large TES modulation due to an eccentric disc occurs. TES modulation is a phenomenon which occurs due to a track radius difference between the outer circumference and the inner circumference of a disc. TES modulation may be reduced as a distance between the main light and the sub light on the optical information storage media 1 is as near as possible. Thus, it is advantageous in terms of TES modulation characteristics that a gap between a main light reception part and a sub light reception part is not widened.

If a photo-detector such as, for example, photo-detector 40 illustrated in FIG. 3 is used, the first sub light reception parts 43 and 45 are formed in a pattern where the areas 43a and 45a on which the noise sub light beams ③ and ⑦ are incident are recessed. The use of such a photo-detector prevents the first light from being unnecessarily diffracted by a diffraction pattern surface formed to divide the second light suitable for the CD1b and once more diffracted by a diffraction pattern surface formed to divide the first light suitable for the DVD 1a is received. The distance between the first main light reception part 42 and the first sub light reception parts 43 and 45 for a photo-detector, such as photo-detector 40 illustrated in FIG. 3, can be reduced such that the first main light reception part 42 and the first sub light reception parts 43 and 45 may be nearer than in the general photo-detector 40'.

Although the examples described above include a compatible optical pickup that is suitable for compatible recording/reproducing of the plurality of optical information storage media 1 (e.g., the DVD 4a and the CD 1b), and that includes first sub light reception parts 43 and 45 which are configured to reduce reception of noise sub light such that the photo-detector 40 detects an excellent TES in the recording/reproducing of an optical information storage medium (e.g., the DVD 1a), the examples described are illustrations of various aspects. Aspects are not limited to the examples described. For example, the optical pickup may include second sub light reception parts 47 and 49 which are configured or formed similar to the first sub light reception parts 43 and 45 so as to detect signals when the optical pickup is recording/reproducing another optical information storage medium (e.g., a CD 1b). The second sub light reception parts 47 and 48 may be configured or formed so as to reduce the reception of noise sub light when a TES is obtained using a differential push-pull method. Light beams divided by the second diffraction pattern surface 22a for dividing a second light that is directed to the CD 1b may be once more divided by the first diffraction pattern surface 22b so as to divide the first light for the DVD 1a. Accordingly, a zero-order light beam passing through the second diffraction pattern surface 22a is once more diffracted to zero-order, + first-order, and − first-order light beams by being divided in the first diffraction pattern surface 22b. These once more diffracted + first-order and − first-order light beams can affect the sub push-pull signal SPP in terms of diffraction efficiency together with + first-order and − first-order light beams divided in the second diffraction pattern surface 22a. Therefore, as an example, the second sub light reception parts 47 and 49 may be formed to reduce reception of noise sub light, i.e., the once more diffracted + first-order and − first-order light beams.

In addition, although it has been described and shown that the second diffraction pattern surface 22a is located in a direction of light incident from the light source unit 21 and the first diffraction pattern surface 22b is located in an opposite side of the diffraction device 22, the diffraction device 22 may be configured or positioned such that the first diffraction pattern surface 22b is located in the direction of light incident from the light source unit 21. In such an example, the noise sub light, which may affect the sub push-pull signal SPP, may be + first-order and − first-order light beams obtained from a zero-order light beam passing through the first diffraction pattern surface 22b, which is once more diffracted by the second diffraction pattern surface 22a.

In addition, although the examples described above include an optical pickup that is compatible with recording/reproducing a DVD 1a and a CD 1b, the compatible optical pickup may be modified to compatibly use the DVD 1a and a BD 1c. For example, various aspects may include a compatible optical pickup that is configured to record data to and/or reproduce data from a plurality of storage media. As a non-limiting example, the storage media may include a CD, a DVD, a BD, or the like. Moreover, various aspects may include a compatible optical pickup that is configured to record data to and/or reproduce data from a combination of the plurality of storage media.

For example, the compatible optical may compatibly use the BD 1c, in addition to, or as an alternative to, the compatible recording/reproducing of the DVD 1a and the CD 1b.

Figure 8:
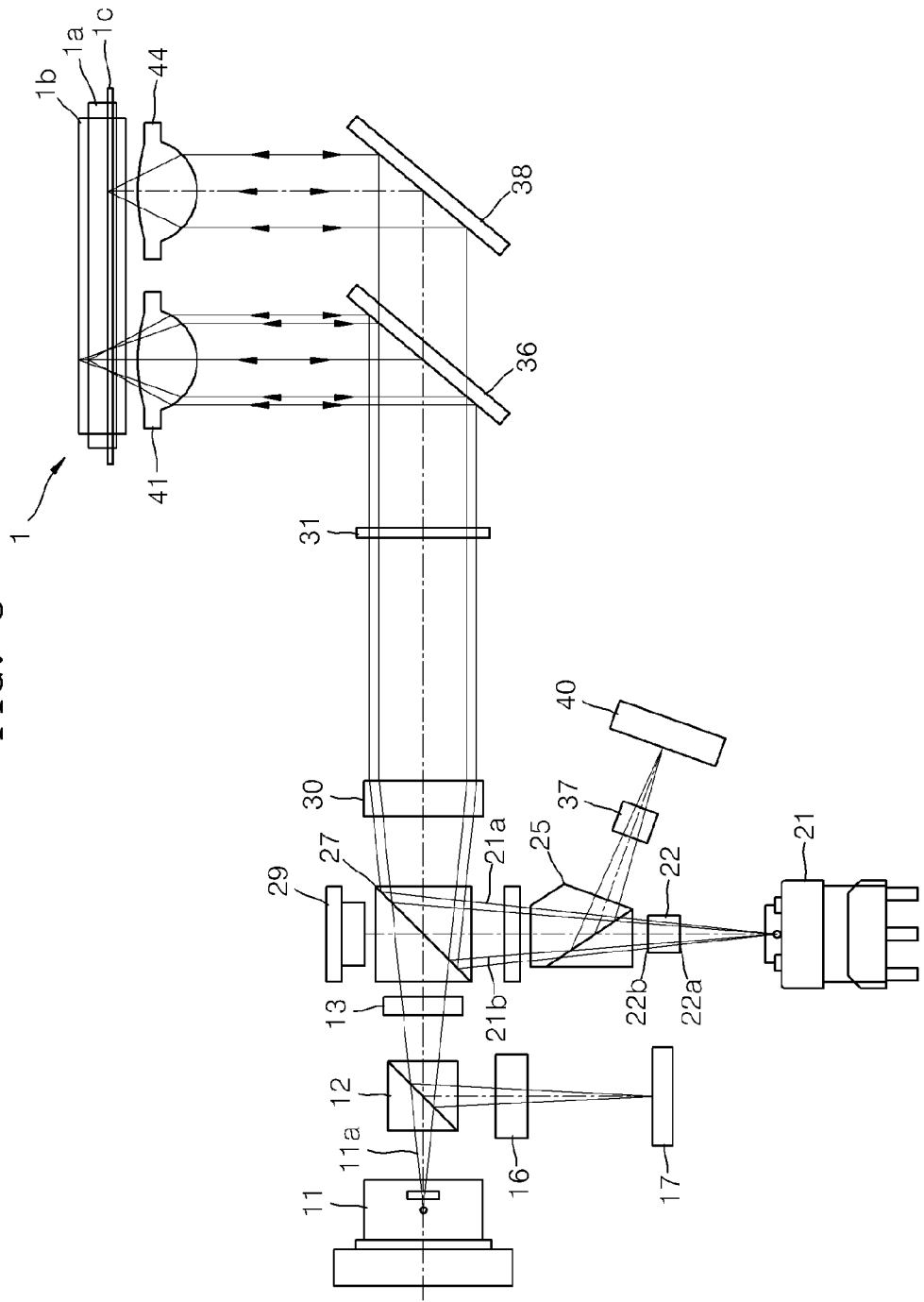
FIG. 8 is a diagram illustrating an example of an optical configuration of a compatible optical pickup.

FIG. 8 illustrates an example of an optical configuration of a compatible optical pickup. The compatible optical pickup illustrated in FIG. 8 includes optical components for recording/reproducing of a BD 1c. Accordingly, compared with the compatible optical pickup illustrated in FIG. 1, the compatible optical pickup illustrated in FIG. 8 has additional optical components for recording/reproducing of the BD 1c. Common reference numbers between FIG. 8 and FIG. 1 reflect similar elements (e.g., optical components). Therefore, repetitive description of common elements is omitted.

Referring to FIG. 8, the compatible optical pickup may further include a single light source 11 for recording data to and/or reproducing data from the BD 1c, so as to perform compatible recording/reproducing of the DVD 1a, the CD 1b, and the BD 1c. The compatible optical pickup may further include an objective lens 44 suitable for the BD 1c, so as to focus third light incident from the single light source 11 on the BD 1c and a photo-detector 17 that is configured to detect the third light emitted from the single light source 11 for the BD 1c and reflected from the BD 1c. The single light source 11 for the BD 1c emits the third light having a blue wavelength (e.g., the third light having a wavelength of about 405 nm), that is used for recording/reproducing of the BD 1c. The photo-detector 17 may have a configuration corresponding to the first main light reception part 42 and the first sub light reception parts 43 and 45 or the second main light reception part 46 and the second sub light reception parts 47 and 49 of the above-described photo-detector 40. The compatible optical pickup may further include an optical path changer 12 (e.g., a beam splitter), that is configured to change an optical path so as to guide the third light emitted from the single light source 11 to the BD 1c and to guide the third light reflected from the BD 1c to the photo-detector 17 on an optical path between the single light source 11 and the objective lens 44. The compatible optical pickup may further include an astigmatic lens 16, such as, for example, a cylindrical lens, that is configured to detect a focus error signal using the astigmatic method. The astigmatic lens 16 may be positioned on an optical path between the optical path changer 12 and the photo-detector 17. In addition, when a TES is detected by using 3 light beams, a diffraction device 13 may be further included between the single light source 11 and the beam splitter 27. In FIG. 8, reference numerals 36 and 38 denote a wavelength selective reflection mirror 36 and a reflection mirror 38 for bending a path of light to guide incident light to objective lenses 41 and 45. The wavelength selective reflection mirror 36 may reflect the first light for the DVD 1a and the second light for the CD 1b to the objective lens 41 and transmit the third light for the BD 1c. A path of the third light for the BD 1c, which has been transmitted through the wavelength selective reflection mirror 36, is bended by the reflection mirror 38 such that the third light is guided to the objective lens 44.

As shown in FIG. 8, when not only the DVD 1a and the CD 1b but also the BD 1c are compatibly applied, the monitoring photo-detector 29 may be configured to monitor the optical output intensity of the first light to the third light. In addition, the beam splitter 27 may include a beam splitter for 3 wavelengths. As an example, the beam splitter 27 may reflect the first light for the DVD 1a and the second light for the CD 1b and transmit the third light for the BD 1c. The collimating lens 30 may also collimate the third light for the BD 1c. The ¼-wave plate 31 may also include a ¼-wave plate for 3 wavelengths to act as a ¼-wave plate for the third light for the BD 1c.

Although it has been described with reference to FIG. 8 that the compatible optical pickup compatibly uses not only the DVD 1a and the CD 1b but also the BD 1c, the compatible optical pickup is not limited to the configuration of FIG. 8 and can be modified in various forms.

Figure 9:
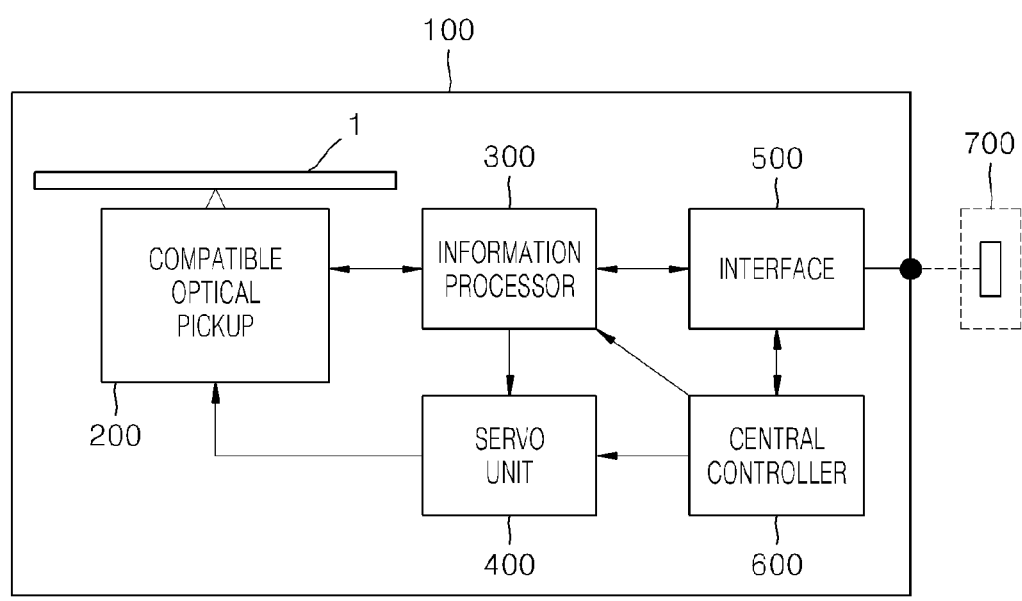
FIG. 9 is a diagram illustrating an example of an optical information storage medium system to which a compatible optical pickup provided in one aspect is applied.

FIG. 9 is a schematic block diagram that illustrates an example of an optical information storage medium system 100 to which a compatible optical pickup provided in one aspect is applied.

Referring to FIG. 9, the optical information storage medium system 100 includes a compatible optical pickup 200 movably installed in a radius direction of the optical information storage media 1 to reproduce information recorded on the optical information storage media 1 or record information thereto, and a controller 600 that is configured to control the compatible optical pickup 200.

The compatible optical pickup 200 may include an optical system having various configurations as described above and a mechanical system mechanically supporting the optical system and performing focusing and tracking operations. For example, the optical system includes an encoder/decoder and is connected to an information processor 300 connected to an interface 500 to be connected to an external host, and the mechanical system is connected to a servo unit 400. The information processor 300, the servo unit 400, and the interface 500 are controlled by the controller 600, (e.g., a central controller). The interface 500 may conform to various standards and, for example, includes a Universal Serial Bus (USB) port. As an example, the interface 500 transmits and receives information according to a USB protocol by being connected to a computer 700.

Disk drives as described in the above examples may be included in an electronic device. As a non-exhaustive illustration only, an electronic device described herein may refer to devices such as a digital camera, a portable game console, a portable/personal multimedia player (PMP), a portable laptop PC, and devices such as a desktop PC, a high definition television (HDTV), an optical disc player, a set top box, and the like.

The units described herein may be implemented using hardware components and software components. For example, microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

In one aspect, there is provided a compatible optical pickup for detecting a tracking error signal of better characteristics by avoiding interference due to undesired diffraction in a diffraction device in a structure of sharing a single diffraction device for light having a plurality of wavelengths, and an optical information storage medium system using the same.

In one aspect, there is provided a compatible optical pickup having a structure in which a single diffraction device is shared and used to deal with light having a plurality of wavelengths and an optical information storage medium system using the same, a tracking error signal having better characteristics can be detected by avoiding interference due to undesired diffraction in the diffraction device.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An optical pickup comprising:
a light source unit that is configured to emit light having a plurality of different wavelengths which are suitable for at least one of recording data to and reproducing data from a plurality of information storage media;
a diffraction device comprising a plurality of diffraction patterns corresponding to the plurality of different wavelengths, the diffraction device being configured to divide light incident from the light source unit into main light and sub light;
an objective lens that is configured to focus incident light so as to form an optical spot for at least one of recording data to and reproducing data from of an information storage medium; and
a photo-detector comprising a first main light reception unit that is configured to receive the main light and a first sub light reception unit that is configured to receive the sub light to detect at least one of an information signal and an error signal, by receiving light reflected from the information storage medium,
wherein the first sub light reception unit of the photo-detector is formed in a pattern such that an area, on which noise sub light is incident, is shaped to comprise a circular or semi-circular recessed area so as to reduce reception of the noise sub light due to diffraction based on an undesired diffraction pattern of sub light being generated by the diffraction device.

2. The optical pickup of claim 1, wherein the plurality of information storage media comprises a Digital Versatile Disc (DVD) and a Compact Disc (CD),
the light source unit emits light of a first wavelength which is suitable for the DVD and light of a second wavelength which is suitable for the CD, and
the first sub light reception unit of the photo-detector reduces reception of the noise sub light based on the light of the first wavelength.

3. The optical pickup of claim 2, wherein the area is formed to have a radius of curvature larger than the noise sub light.

4. The optical pickup of claim 3, wherein the first main light reception unit and the first sub light reception unit of the photo-detector receive light of the first wavelength, and
the photo-detector further comprises a second main light reception unit and a second sub light reception unit that are configured to receive light of the second wavelength.

5. The optical pickup of claim 4, wherein the plurality of diffraction patterns of the diffraction device comprises:
a first diffraction pattern that is configured to divide the light of the first wavelength and to provide the divided light to the first main light reception unit and the first sub light reception unit; and
a second diffraction pattern that is configured to divide the light of the second wavelength and to provide the divided light to the second main light reception unit and the second sub light reception unit.

6. The optical pickup of claim 2, wherein the first main light reception unit and the first sub light reception unit of the photo-detector receive light of the first wavelength, and
the photo-detector further comprises a second main light reception unit and a second sub light reception unit that are configured to receive light of the second wavelength.

7. The optical pickup of claim 6, wherein the plurality of diffraction patterns of the diffraction device comprises:
a first diffraction pattern that is configured to divide the light of the first wavelength and to provide the divided light to the first main light reception unit and the first sub light reception unit; and
a second diffraction pattern that is configured to divide the light of the second wavelength and to provide the divided light to the second main light reception unit and the second sub light reception unit.

8. The optical pickup of claim 1, wherein the recessed area is formed to have a radius of curvature larger than the noise sub light.

9. The optical pickup of claim 1, wherein at least a subset of the plurality of different wavelengths emitted from the light source is suitable for at least one of recording data to and reproducing data from the plurality of information storage media.

10. An optical pickup comprising:
a light source unit comprising a first light source that is configured to emit light of a first wavelength which is suitable for a Digital Versatile Disc (DVD), and light of a second wavelength which is suitable for a Compact Disc (CD), and a second light source which is suitable for a Blu-ray disc (BD);
a diffraction device comprising a plurality of diffraction patterns corresponding to the plurality of different wavelengths, the diffraction device being configured to divide light emitted by the light source unit into main light and sub light;
an objective lens that is configured to focus incident light so as to form an optical spot for at least one of recording data to and reproducing data from an optical information storage medium; and
a photo-detector comprising a first main light reception unit that is configured to receive the main light and a first sub light reception part that is configured to receive the sub light so as to detect at least one of an information signal and an error signal by receiving light reflected from the optical information storage medium,
wherein the first sub light reception unit of the photo-detector is formed in a pattern such that an area, on which noise sub light is incident, is shaped to comprise a circular semi-circular recessed area so as to reduce reception of the noise sub light due to diffraction based on an undesired diffraction pattern of sub light with respect to the light of the first wavelength being generated by the diffraction device.

11. The optical pickup of claim 10, wherein the objective lens is used for the DVD and the CD, and
further comprising a second objective lens for the BD.

12. An information storage medium apparatus comprising:
an optical pickup that is movably installed in a radius direction of an information storage medium so as to reproduce information recorded on the information storage medium or record information on the information storage medium; and
a controller that is configured to control the optical pickup, wherein the optical pickup comprises:
a light source unit that is configured to emit light having a plurality of different wavelengths, at least a subset of the plurality of different wavelengths being suitable for at least one of recording data to and reproducing data from a plurality of information storage media;
a diffraction device comprising a plurality of diffraction patterns corresponding to the plurality of different wavelengths, the diffraction device being configured to divide light incident from the light source unit into main light and sub light;
an objective lens that is configured to focus incident light so as to form an optical spot for at least one of recording data to and reproducing data from the information storage medium; and
a photo-detector comprising a first main light unit that is configured to receive the main light and a first sub light reception unit that is configured to receive the sub light to detect at least one of an information signal and an error signal, by receiving light reflected from the information storage medium, and
the first sub light reception unit of the photo-detector is formed in a pattern such that an area on which noise sub light is incident is shaped to comprise a circular or semi circular recessed area so as to reduce reception of the noise due to diffraction based on an undesired diffraction pattern of sub light being generated by the diffraction device.

13. The information storage medium apparatus of claim 12, wherein the plurality of information storage media comprises a Digital Versatile Disc (DVD) and a Compact Disc (CD),
the light source unit emits light of a first wavelength which is suitable for the DVD and light of a second wavelength which is suitable for the CD, and
the first sub light reception unit of the photo-detector reduces reception of noise sub light based on the light of the first wavelength.

14. The information storage medium apparatus of claim 13, wherein the area of the first sub light reception unit further comprises at least three additional recessed areas.

15. The information storage medium apparatus of claim 13, wherein the first main light reception unit and the first sub light reception unit of the photo-detector receive light of the first wavelength, and
the photo-detector further comprises a second main light reception unit and a second sub light reception that are configured to receive light of the second wavelength suitable for the CD.

16. The information storage medium apparatus of claim 15, wherein the plurality of diffraction patterns of the diffraction device comprises:
a first diffraction pattern that is configured to divide the light of the first wavelength and to provide the divided light to the first main light reception unit and the first sub light reception unit; and
a second diffraction pattern that is configured to divide the light of the second wavelength and to provide the divided light to the second main light reception unit and the second sub light reception unit.

17. The information storage medium apparatus of claim 13, wherein the first main light reception unit and the first sub light reception unit of the photo-detector receive light of the first wavelength, and
the photo-detector further comprises a second main light reception unit and a second sub light reception unit that are configured to receive light of the second wavelength.

18. The information storage medium apparatus of claim 17, wherein the plurality of diffraction patterns of the diffraction device comprises:
a first diffraction pattern that is configured to divide the light of the first wavelength and to provide the divided light to the first main light reception part and the first sub light reception unit; and
a second diffraction pattern that is configured to divide the light of the second wavelength and to provide the divided light to the second main light reception unit and the second sub light reception unit.

19. The information storage medium apparatus of claim 12, wherein recessed area is formed to have a radius of curvature larger than the noise sub light.

20. The information storage medium apparatus of claim 12, wherein the optical pickup further comprises a second light source which is suitable for a Blu-ray disc (BD).

21. The information storage medium apparatus of claim 12, wherein the objective lens of the optical pickup is used for a Digital Versatile Disc (DVD) and a Compact Disc (CD), and
the optical pickup further comprises a second objective lens for a Blu-ray disc (BD).

* * * * *